United States Patent
Li et al.

(10) Patent No.: US 10,965,965 B2
(45) Date of Patent: Mar. 30, 2021

(54) DETECTING OF GRAPHICAL OBJECTS TO IDENTIFY VIDEO DEMARCATIONS

(71) Applicant: ARRIS ENTERPRISES LLC, Suwanee, GA (US)

(72) Inventors: Renxiang Li, Lake Zurich, IL (US); Faisal Ishtiaq, Chicago, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/640,147

(22) Filed: Mar. 6, 2015

(65) Prior Publication Data

US 2016/0261894 A1    Sep. 8, 2016

(51) Int. Cl.
  *H04N 21/234*    (2011.01)
  *G06K 9/00*    (2006.01)
  (Continued)

(52) U.S. Cl.
  CPC ... *H04N 21/23418* (2013.01); *G06K 9/00711* (2013.01); *G06K 9/00718* (2013.01);
  (Continued)

(58) Field of Classification Search
  CPC ....... H04N 21/23418; H04N 21/23439; H04N 21/8456; H04N 21/232; G06K 9/3241;
  (Continued)

(56) References Cited

U.S. PATENT DOCUMENTS 5,778,108 A * 7/1998 Coleman, Jr. .......... H04N 19/87
  348/700

5,974,219 A * 10/1999 Fujita .................. G11B 27/034
  386/290

(Continued)

FOREIGN PATENT DOCUMENTS

| CN | 102290082 B | 3/2014 |
| EP | 2362396 A2 | 8/2011 |

(Continued)

OTHER PUBLICATIONS

H. Pan, et al., "Automatic detection of replay segments in broadcast sports programs by detection of logos in scene transitions", Sharp Laboratories of America Inc., (ICASSP) 2002.

(Continued)

*Primary Examiner* — Nnenna N Ekpo
(74) *Attorney, Agent, or Firm* — Buchanan Ingersoll & Rooney PC

(57) ABSTRACT

Particular embodiments analyze logos found in a video program to determine video demarcations in the video program. For example, a video demarcation may be content that marks ("marker content") a transition from a first video content type to a second video content type. Marker content may be used so the user knows that a transition is occurring. Particular embodiments analyze the logos found in a video program to determine the video demarcations in the video. The video is first analyzed to determine logos in the video program. Once these logos are determined, particular embodiments may re-analyze the video program to identify marker frames that include the marker content that signal the transitions to a different video content types. The marker frames may be determined without any prior knowledge of the marker content. Then, particular embodiments may use the marker frames to determine video segments.

15 Claims, 12 Drawing Sheets

(51) Int. Cl.
  *G06K 9/32* (2006.01)
  *H04N 21/2343* (2011.01)
  *H04N 5/14* (2006.01)
  *H04N 21/845* (2011.01)
  *G11B 27/32* (2006.01)

(52) U.S. Cl.
  CPC ..... *G06K 9/00724* (2013.01); *G06K 9/00744* (2013.01); *G06K 9/00758* (2013.01); *G06K 9/00765* (2013.01); *G06K 9/3241* (2013.01); *G11B 27/322* (2013.01); *H04N 5/147* (2013.01); *H04N 21/23439* (2013.01); *H04N 21/845* (2013.01); *G06K 2209/25* (2013.01)

(58) Field of Classification Search
  CPC ............ G06K 9/00711; G06K 2209/25; G06T 7/0046; G06T 2207/30204; G06T 7/0042; G06T 2207/10016; G06T 2207/20076
  See application file for complete search history.

(56) References Cited

U.S. PATENT DOCUMENTS

| | | | | |
|---|---|---|---|---|
| 6,101,222 A * | 8/2000 | Dorricott | ............... | G11B 27/28 348/700 |
| 6,771,316 B1 * | 8/2004 | Iggulden | ............... | H04N 5/44 348/460 |
| 8,634,652 B2 * | 1/2014 | Lienhart | ............ | G06F 17/30802 382/124 |
| 8,965,179 B1 * | 2/2015 | Steger | ............... | G11B 27/031 386/280 |
| 9,258,604 B1 * | 2/2016 | Bilobrov | ............... | H04N 21/466 |
| 9,510,044 B1 * | 11/2016 | Pereira | ............ | H04N 21/44008 |
| 9,565,456 B2 * | 2/2017 | Helferty | ............. | H04N 21/4542 |
| 2003/0076448 A1 | 4/2003 | Pan et al. | | |
| 2006/0090186 A1 * | 4/2006 | Santangelo | ........ | H04N 7/17336 725/87 |
| 2009/0320060 A1 * | 12/2009 | Barrett | ................ | H04N 21/812 725/32 |

FOREIGN PATENT DOCUMENTS

| | | |
|---|---|---|
| EP | 2259207 B1 | 10/2012 |
| EP | 2775730 A1 | 9/2014 |

OTHER PUBLICATIONS

P. Su, et al., "Transition effect detection for extracting highlights in baseball videos", EURASIP Journal on Image and Video Processing, May 2013.

PCT Search Report & Written Opinion, Re: Application No. PCT/US2016/020709, dated May 31, 2016.

Official Action, Re: Canadian Application No. 2,977,680, dated Jun. 26, 2018.

Official Action, Re: Mexican Application No. MX/a/2017/011263, dated Feb. 27, 2019.

Examination Report, Re: European Application No. 16712586.3, dated Oct. 8, 2019.

* cited by examiner

|      | A  | B  | C  | D  |
|------|----|----|----|----|
| A    | 0  | 10 | 2  | 3  |
| B    | 13 | 0  | 15 | 12 |
| C    | 1  | 12 | 0  | 3  |
| D    | 2  | 13 | 3  | 0  |

FIG. 10

DETECTING OF GRAPHICAL OBJECTS TO IDENTIFY VIDEO DEMARCATIONS

BACKGROUND

Video content owners or distributors may insert various logos into video programs. For example, a television station may insert a station logo into a video program to identify the television station broadcasting the video. Also, other logos may be inserted into the video programs. For example, the television station inserts a score panel that shows the current score of a sports event into a broadcast of a sporting event.

A broadcast of a video program, such as a sporting event, may include different content types. For example, the sporting event may be a "live" showing of the event. That is, the video program is played in real-time or with minimal delay from when the actual event is being played. During the program, advertisements may be inserted. Also, the live recording may also be interrupted by other content, such as when highlights are played during the broadcast.

BRIEF DESCRIPTION OF THE DRAWINGS

FIG. 10 shows a table that may be used as a simplified example to perform the correlation according to one embodiment.

DETAILED DESCRIPTION

Described herein are techniques for a content type detection system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments analyze logos found in a video program to determine video demarcations in the video program. For example, a video demarcation may be content that marks ("marker content") a transition from a first video content type to a second video content type. In one embodiment, the first video content type is regular programming (e.g., a live event or show) and the second video content type different from the regular programming, such as a highlight (e.g., non-live content). Marker content may be used so that a user knows that a transition is occurring. For example, a set of marker frames that contain the marker content, which may be a video animation or other information, is inserted into the video program as video demarcations.

Whenever transitions occur, a set of marker frames may be inserted. For example, during a video broadcast, the video program may transition to different types of video content, such as to the highlight in a live sporting event broadcast. The highlight may be a non-live playback scenario where the live sporting event transitions to the highlight of a previous play in the sporting event. To transition to the different type of video content, the video broadcaster may insert a set of marker frames containing the marker content, such as a video animation. This marker content may be repeated every time the highlight is shown in the video program. Also, when the highlight is finished, the same marker content may be inserted to indicate to a user that the video program is transitioning back to the live playback.

Particular embodiments analyze the logos found in a video program to determine the video demarcations in the video. For example, the presence or absence of a logo may be used to determine when transitions to different content types occur in the video program. The video is first analyzed to determine logos in the video program. Once these logos are determined, particular embodiments may re-analyze the video program to identify marker frames that include the marker content that signal the transitions to a different video content types. The marker frames may be determined without any prior knowledge of the marker content. Then, particular embodiments may use the marker frames to determine video segments. For example, the marker frames may be used to determine video segments that only include the highlights in a sporting event.

System Overview

Figure 1:
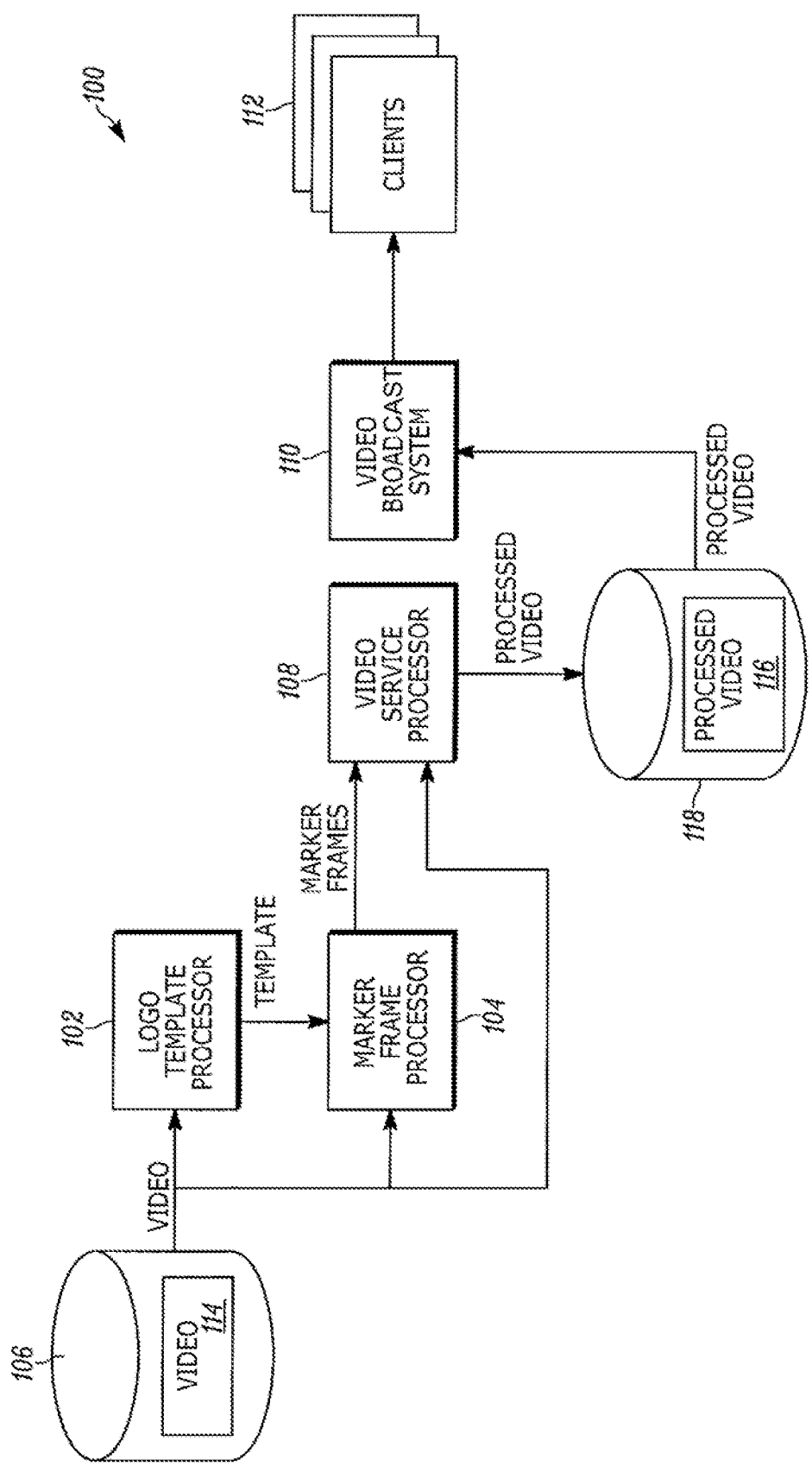
FIG. 1 depicts a simplified system for identifying video demarcations according to one embodiment.

FIG. 1 depicts a simplified system 100 for identifying video demarcations according to one embodiment. System 100 includes various processors and systems that may include one or more computing devices. These processors are integral to performing the process described below. A logo template processor 102 and a marker frame processor 104 process a video 114 that may be stored in storage 106 to determine video demarcations in video 114. The video demarcations are represented by marker frames that distinguish a transition from a first video content type to a second video content type in video 114. The marker frames include marker content, which may be content that is repeated when transitions in video content types occur. Once the marker frames are determined, a video service processor 108 may perform a service on the video based on the marker frames. The service may create a processed video 116 of video segments that are formed based on the demarcations identified by the marker frames. Video service processor 108 may store processed video 116 in storage 118. Then, a video delivery system 110 may send processed video 116 to clients 112.

In the process of generating marker frames, logo template processor 102 receives video 114 from storage 106. Video 114 may be a video program of a prior broadcast of a live event, such as a sports event. In other embodiments, video 114 may be a video that is currently being broadcast (e.g., a live event) and does not have to be retrieved from storage 106. Video 114 may also be a video program of a non-live event, such as a television show, movie, or reality show. In one embodiment, video 114 is a recording of a completed broadcast of the video program because particular embodiments analyze the entire video in two separate passes as will be described below.

Logo template processor 102 may perform a first analysis that analyzes the entire video 114. In one embodiment, the first analysis of video 114 determines logos in video 114. A logo may be an image that is included in the video program. In one embodiment, the logo may be an overlay image that is overlaid over the original video program. This may create a blended image where the logo is blended into the background of the original video content. Other logos may also be appreciated including non-blended logos. The logo may be identifiable by some logo content, such as a station logo ("SL") or score panel. In one embodiment, logo template processor 102 identifies dominating logos in video 114. A dominating logo may be a logo that appears in video 114 over a threshold amount of time. From the analysis, logo template processor 102 may generate a logo template of the logos that are detected. For example, the logo template may include the dominating logos determined from analyzing frames in video 114. In one embodiment a single template with all dominating logos is used, but multiple templates may also be used, such as a template for each logo. When the term "frames" is used, frames may be a portion of video 114, such as a picture or an image.

Marker frame processor 104 then performs a second analysis of the entire video 114 using the logo template. Marker frame processor 104 retrieves video 114 from storage 106 and also receives the logo template from logo template processor 102. Marker frame processor 104 then uses the logo template to analyze video 114. The analysis of video 114 using the logo template will be described in more detail below. However, in short, marker frame processor 104 identifies marker frames in video 114 that include marker content. As discussed above, the marker frames identify video demarcations that indicate transitions in video 114 from a first content type to a second content type. In one embodiment, the marker content is inserted multiple times in the video program, which allows marker frame processor 104 to identify marker frames without prior knowledge of the marker frame content.

Once determining the marker frames, marker frame processor 104 outputs identifiers for the marker frames. The identifiers may indicate a frame number, a time in the video in which the marker frames are encountered, or other identification information for the marker frames. Video service processor 108 may receive the marker frame identifiers and perform various services with video 114. For example, video service processor 108 may determine different types of video content in video 114 using the marker frames. In one embodiment, visual features are extracted from the identified marker frames, and matched to the visual features of every frame of the video. Segments of the video 114 can then be determined. In one example, the highlights of the sporting event are determined to be located in between different sets of marker frames. As discussed above, a sporting event may transition from the live content to highlights. Video service processor 108 may then remove the highlights from video 114 to generate a processed video 116. That is, processed video 116 may include just the highlights. In this case, a user may just watch plays that were considered worthy of a highlight. In another example, the highlights may be removed from video 114 such that no highlights appear in processed video 116. This may provide a broadcast of a sporting event without any highlights. When the processing is finished, video service processor 108 may then store processed video 116 in storage 118.

Video delivery system 110 may be any type of system that can broadcast video 114 and/or processed video 116. For example, video delivery system 110 may be a cable system or over-the-top video-on-demand system. Video delivery system 110 may first broadcast video 114 to clients 112. Then, after the processing by video service processor 108, video delivery system 110 retrieves processed video 116 from storage 118, and delivers processed video 116 to clients 112. Clients 112 may include various computing devices, such as set top boxes and televisions, computing devices such as laptop computers, desktop computers, and mobile devices such as cellular or mobile telephones and tablet devices, that can play processed video 116. In one embodiment, visual features are extracted for every frame of broadcasting video and matched against the visual features of marker frames. The visual features are also referred as frame signature. In one embodiment, the frame signatures are the ColorLayout and EdgeHistogram descriptors of MPEG-7. Assuming there are N frames at the identified marker sequence, then N frames of the visual features of the video may be buffered in order to perform the marker frame match. Once there is a match, an identifier is generated which signals the start or end of the identified video segment. This signal can be used, for example, to notify a user that subscribes to the service that a highlight occurs.

Marker Frame Examples

Figure 2:
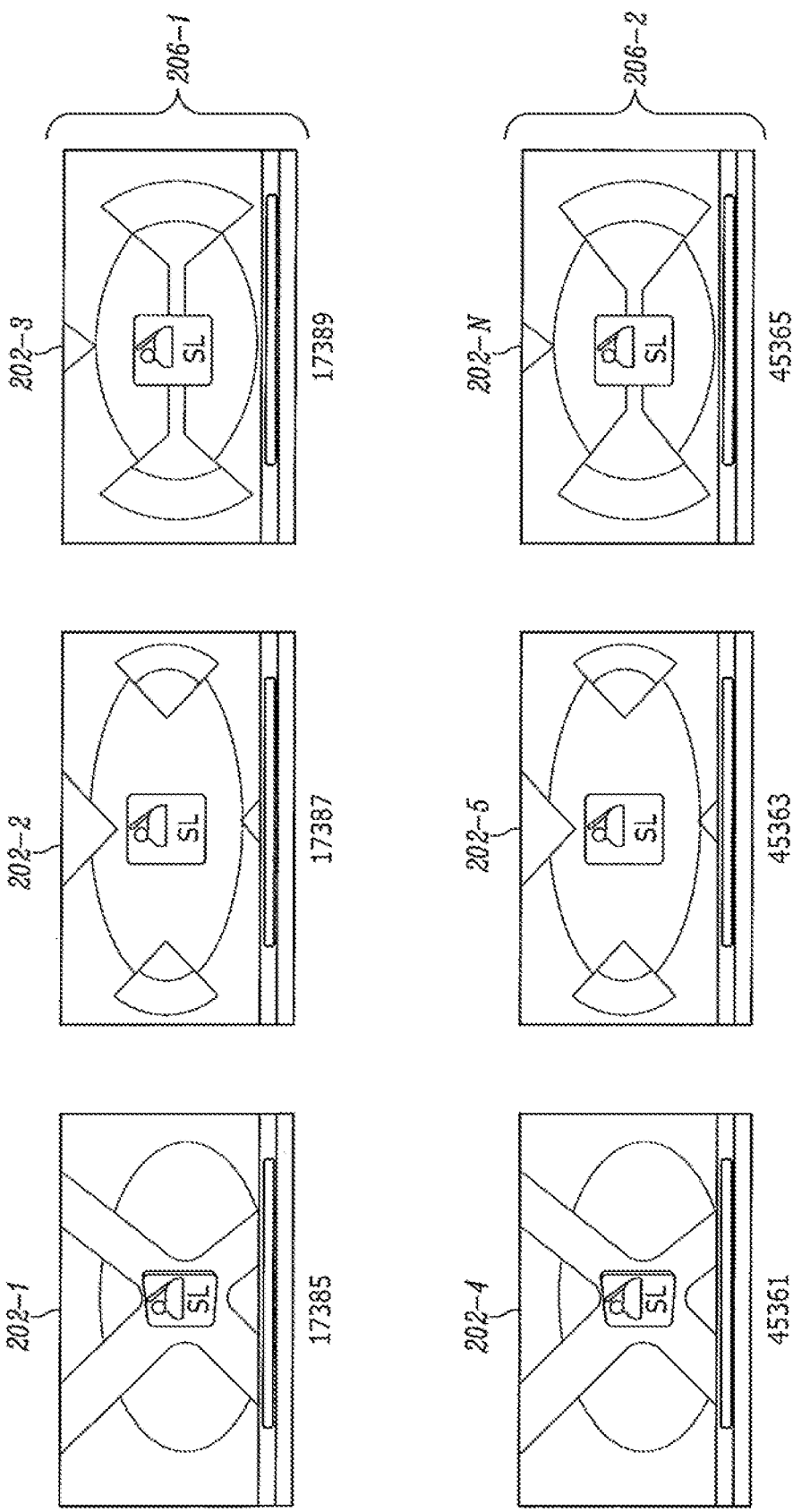
FIG. 2 depicts an example of marker frames according to one embodiment.

Before going into the process for determining marker frames, FIG. 2 depicts an example of marker frames 202 according to one embodiment. Various marker frames 202-1-202-*n* are shown in FIG. 2. Marker frames 202 include similar content, but may be slightly different. A first sequence of marker frames is shown at 206-1 and a second sequence of marker frames is shown at 206-2. Frame numbers identify marker frames 202-1 as 17385, 17387, and 17389 in sequence 206-1. Also, identifiers 45361, 45363, and 45365 identify marker frames 202-4-202-*n* in sequence 206-2.

In this case, frame sequence 206-1 occurs at a different time from frame sequence 206-2 in video 114. The marker frames may be a video animation of content, such as an animation of a logo that proceeds for a certain number of frames. However, a logo does not need to be included in the animation, such as an animation of a character or phrase may be used. An animation may also not be used as any content that is repeated at transitions is contemplated. Also, to clarify, the logo used in the marker frames may be the same or different from a logo used in the logo template. Typically, the logo in the marker frames is not dominant enough to be included in the logo template.

As discussed above, after the sequence of marker frames ends, video 114 may transition to a different type of content, such as a highlight. Each time a highlight is shown, the sequence of the marker frames is played. For example, sequence 206-1 includes the same marker frames as sequence 206-2. However, sequence 206-2 occurs later in video 114 as indicated by the frame numbers. Accordingly, particular embodiments may determine any content type transition that is delineated by the same set of marker frames.

In the sequences shown in FIG. 2, the animation may cause different marker frames to include slightly different content. That is, the logo slightly moves. Due to the subtle differences in the marker frames, processing of the detected marker frames to generate a summary marker frame may be used. For example, an average of all marker frames for a sequence or average for all sequences in the video may be used to generate a summary marker frame. The summary marker frame may then be used to detect marker frames in other videos, or in the same video. For example, the summary marker frame is compared to frames in a second video of another sporting event. In some cases, a station may use the same marker content in multiple videos, such as in most sporting events (e.g., all football games), and thus highlights can be detected in another video without performing the logo analysis. From the comparison, marker frame processor 104 generates an error signal. Using a threshold, it can be determined when a frame having similar content to the summary marker frame is encountered in the second video. This may allow highlights to be determined in the second video without performing the first analysis to determine the logo template. This leverages the notion that the same marker content may be used, such as a television station uses the same marker content to denote highlight transitions in multiple sporting event broadcasts.

Logo Template Generation

Figure 3:
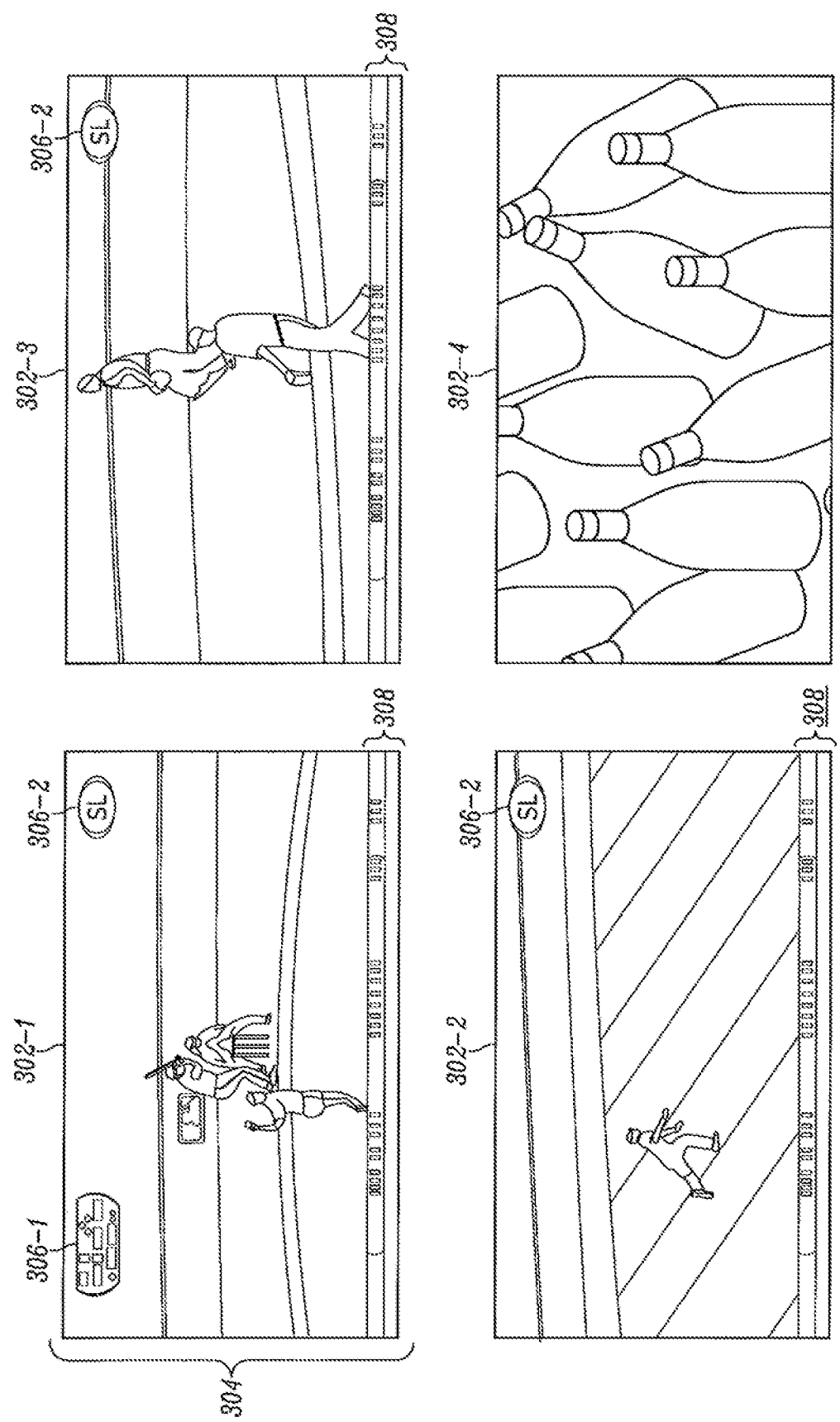
FIG. 3 depicts examples of logos in video according to one embodiment.

The overall process will now be described in more detail. Logo template processor 102 identifies logos in video 114. In one example, dominating logos are detected, which may be logos that may appear for an amount of time or number of times that is determined to be above a threshold. FIG. 3 depicts examples of logos in video 114 according to one embodiment. A frame of video 114 shows a first video content type, which may be the regular broadcast of a live event. For example, frame 302-1 is showing a video of a sporting event at 304. Additionally, logos have been inserted in the video. For example, a first logo 306-1 is a score panel and a second logo 306-2 is a station logo, both of which are overlaid on the video of the sporting event. Other logos may also be found in video 114. For example, a sports ticker at 308 may include logos, which could also be detected as logos.

In a second frame 302-2, logo 306-2 is shown, but logo 306-1 is not. Also, the sports ticker is still shown at 308, but the sports ticker is displaying different content because the ticker constantly scrolls across the screen. In one embodiment, the sports ticker is discarded as a logo by means of spatial position filtering and shape filtering. For example, if a potential logo is long and thin and positioned close to the bottom of the frame, it is not considered as a relevant logo. In second frame 302-2, video 114 may have transitioned to a second type of content from the first type of content. In this case, a highlight scene is being shown in the frame at 302-2. In one embodiment, in highlight scenes, the score panel logo 306-1 is not shown, but the station logo 306-2 is shown. The transition to the second type of content may include marker frames (not shown) to introduce the transition from the sporting event to the highlight.

There may be cases where the absence of the score panel logo 306-1 and the presence of the station logo 306-2 may occur, but the content being shown may not be the desired content type of a highlight scene. For example, in a third frame 302-3, the score panel logo 306-1 is not present, but the station logo 306-2 is present. However, this may be a third type of content, such as a non-highlight scene in which the regular content is transitioning to a fourth type of content, such as an advertisement. The transition to the fourth type of content may not include marker frames to introduce the transition from the sporting event to the non-highlight scene.

A fourth frame 302-4 shows an advertisement in which neither the score panel logo 306-1 nor the station logo 306-2 is shown. This may be the fourth type of content and may not include a marker frame to introduce the transition from the sporting event to the advertisement.

The logos shown in the above frames may or may not be dominating logos. Logo template processor 102 may use various methods to automatically detect logos. In one embodiment, a method used to determine the logo template is described in U.S. patent application Ser. No. 14/595,608, entitled: Automatic Detection of Logos in Video Sequences", filed Jan. 13, 2015, which is incorporated by reference in its entirety for all purposes.

Figure 4:
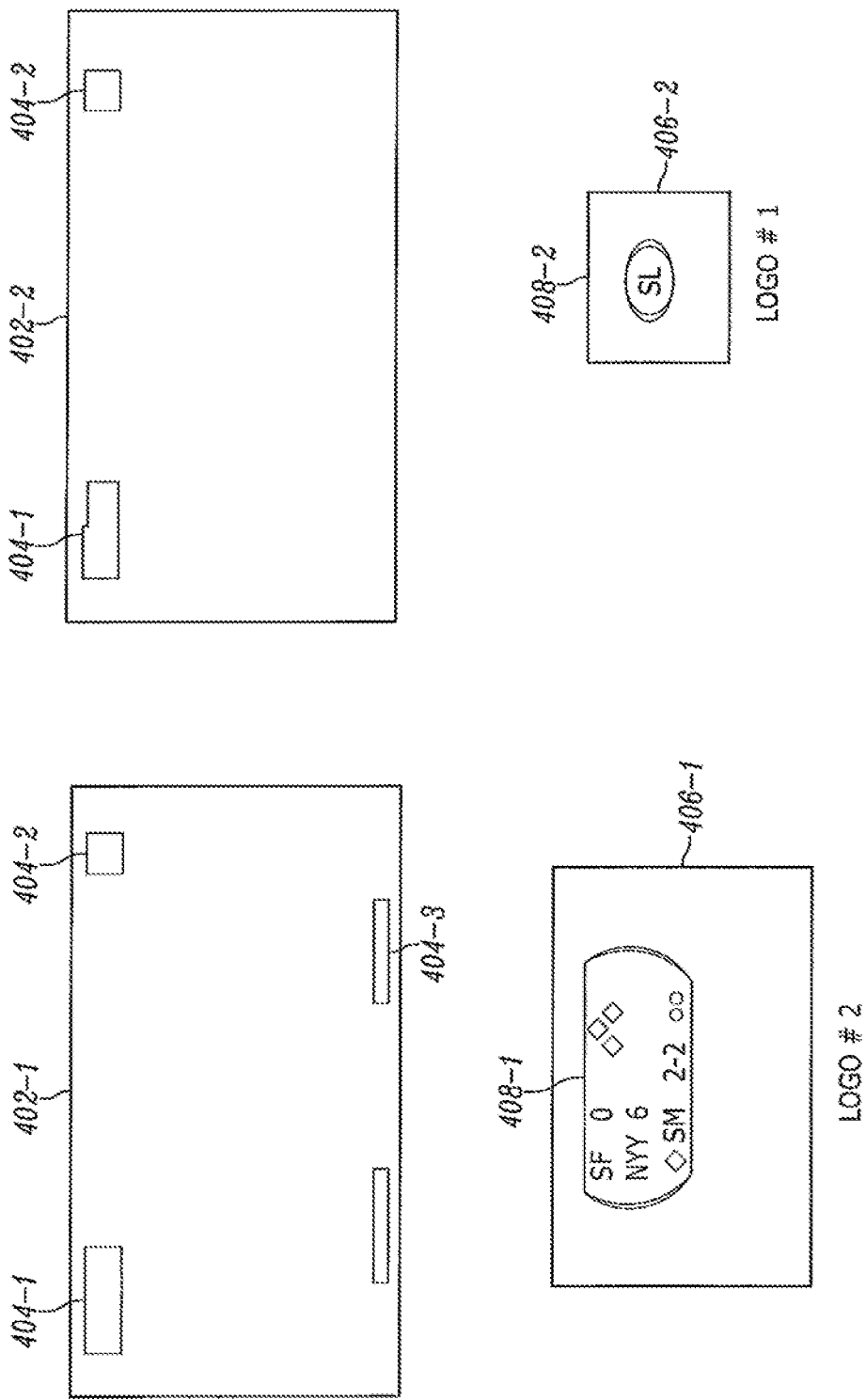
FIG. 4 shows an example of logo templates and logos based on the accumulation process according to one embodiment.

For example, logo template processor 102 may use logo template accumulation and logo matching to determine logos in video 114. FIG. 4 shows an example of logo heat maps and logos based on the accumulation process according to one embodiment. A heat map 402-1 may be an image-based heat map that shows a heat value for accumulators across frames of video 114. There may be an accumulator for each pixel in heat map 402-1. Logo template processor 102 may analyze frames of video 114 to determine logos that occur on individual frames. A bounding box may be created for the detected logos for each frame, which forms a surrounding boundary around the logo. Then, logo template processor 102 accumulates the pixels for the detected logos for the frames in the accumulators for each pixel value in heat map 402-1 that corresponds to the boundary box. Heat map 402-1 operates such that a heat map value for a set of accumulators may be increased each time a logo is detected in a frame.

Heat map 402-1 is shown before applying a threshold. The accumulators 404-1, 404-2, and 404-3 include different values based on how many times a logo was detected in the area of each respective accumulator. In one embodiment, accumulators 404-1 correspond to logo 306-1 in FIG. 3, accumulators 404-2 correspond to logo 306-2, and accumulators 404-3 correspond to logo 308. The value of accumulators 404-1 and 404-2 may be higher than accumulators 404-3. The higher value indicates logos in the area for accumulators 404-1 and 404-2 were detected more often than in the area of accumulators 404-3.

After performing the accumulation, logo template processor 102 may apply a threshold to heat map 402-1. A heat map 402-2 shows the heat map after the threshold has been applied. By applying the threshold, logo template processor 102 determines accumulators that have heat values over a threshold. In this case, accumulators 404-1 and 404-2 have heat values over the threshold, but accumulators 404-3 did not include heat values over the threshold. This may identify dominating logos in video 114.

In one embodiment, heat map 402-2 may be used to determine accumulated logo images. However, in other embodiments, the threshold may not be used and heat map 402-1 may be used instead. More logos may be detected in this case. In heat map 402-2, accumulators 404-1 and 404-2, after applying the threshold, are used to determine associated accumulated logo images from video 114 (this is because the heat map was just accumulating frequency values and not the actual image). Accumulators 404 may be associated with accumulated logo images in corresponding locations in video 114. Logo template processor 102 may determine the accumulated logo template image in different ways. For example, the accumulated logo template image is a summary or average of all the sub-images within the accumulated logos detected for multiple frames in video 114. That is, frames that do not include the logo are not included in the averaging. Or, the accumulated logo template image may be a single logo image taken from a single frame. As shown, at 406-1, an accumulated logo template image is shown at 408-1 and shows a score panel. Additional space around the actual logo may also be captured. In one embodiment, a tight boundary is obtained for the accumulated logo template image in order to exclude non-logo template image pixels when performing template matching. The accumulated logo template image at 408-1 corresponds to accumulators 404-1. Also, at 406-2, an accumulated logo template image is shown at 408-2, which corresponds to accumulators 404-2. The logo may be referred to as a station logo. The logo template may then insert the accumulated logo template images in the positions of the respective accumulators to form the logo template.

Marker Frame Processing

Figure 5:
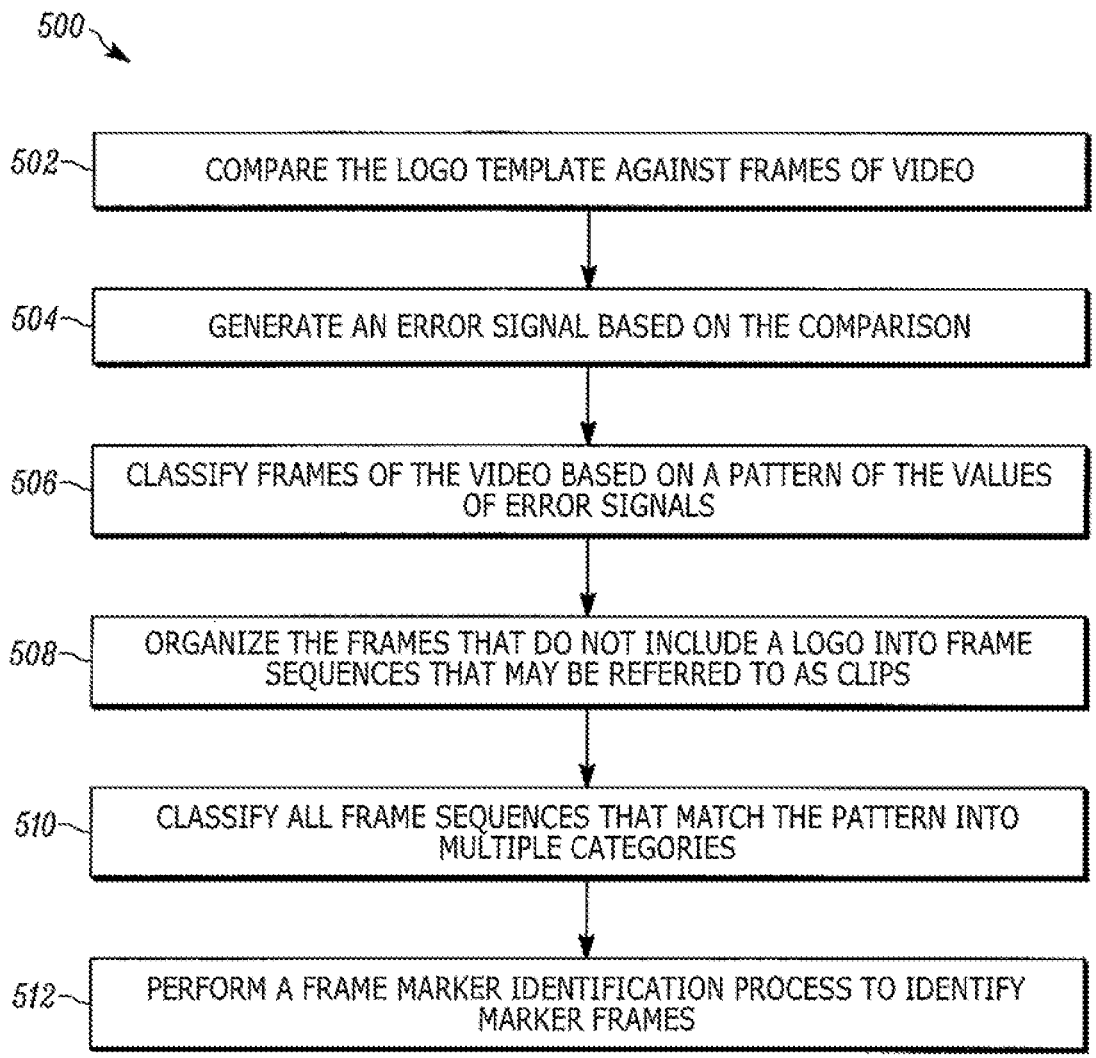
FIG. 5 depicts a simplified flowchart of a method for identifying marker frames according to one embodiment.

Once logo template processor 102 determines the logo template, marker frame processor 104 may then use the logo template to identify marker frames in a second analysis of video 114. It is noted that the logo template may include the accumulated logo template images shown at 408-1 and 408-2 and not the bounding boxes of the heat map. FIG. 5 depicts a simplified flowchart 500 of a method for identifying marker frames according to one embodiment. At 502, marker frame processor 104 compares the logo template against frames of video 114. The comparison of the logo template may compare the accumulated logo template images 408 against every frame of video 114 or a portion of frames of video 114. In one embodiment, marker frame processor 104 compares the corresponding pixels in the logo template against every frame to determine each frame in video 114 that may include the accumulated logo template images.

In one embodiment, at 504, marker frame processor 104 generates an error signal based on the comparison. The error signal may indicate a matching error for every comparison of the logo template against a frame. The error signal quantifies a degree of match between the accumulated logo template image and a frame. That is, the error signal quantifies a difference between the accumulated logo template images and each frame. For example, if a frame includes a logo that substantially matches the accumulated logo template image, then the error signal would output a low error value because a substantial match is determined. However, if the frame does not include a logo that matches or is close to the accumulated logo template image, then the error signal would have a high error value. This is because the match is low or there is very little match in this frame. Although an error signal is described, other methods of quantifying the comparison of the logo template to every frame in video 114 may be used.

Figure 6:
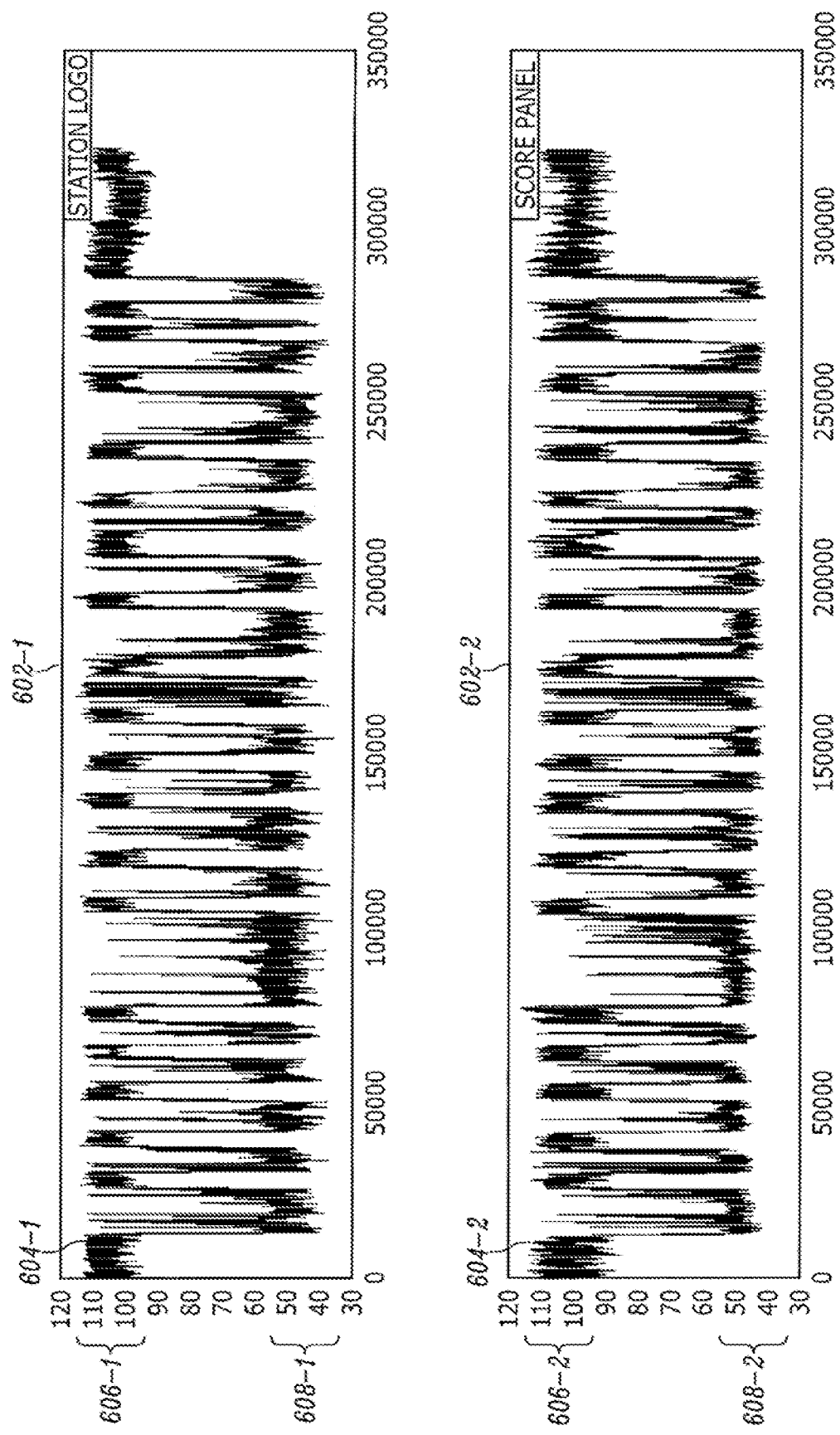
FIG. 6 shows an example of error signals according to one embodiment.

FIG. 6 shows an example of error signals according to one embodiment. A graph at 602-1 shows an error signal for the accumulated logo template image 408-2 (e.g., the station logo) and a graph 602-2 shows an error signal for the accumulated logo template image 408-1 (e.g., the score panel). The Y axis of graphs 602 is an error signal value and the X axis shows frame identifiers of video 114. The first accumulated logo template image 408-1 will be referred to as the score panel logo and the second accumulated logo template image 408-2 will be referred to as the station logo. In graph 602-1, an error signal 604-1 indicates a matching error for video 114 for the station logo. A similar error signal 604-2 shows an error signal in graph 602-2 for the score panel logo.

The error signal may indicate the value of a matching error. For example, a high matching error may be shown at 606-1 and 606-2, respectively, in graphs 602-1 and 602-2. The high matching error may indicate the absence of station logo or score panel logo in corresponding frames of video 114. A low matching error may be shown at 608-1 and 608-2, respectively. The low matching error may indicate the presence of the station logo or the score panel logo in frames of video 114.

Referring back to FIG. 5, at 506, marker frame processor 104 classifies frames of video 114 based on a pattern of the values of error signals 604-1 and 604-2. In one embodiment, marker frame processor 104 classifies the frames of the videos into multiple categories based on a pattern of the presence or absence of logos in a frame. In one example, two categories are used that categorize frames in a first category of including a logo found in the logo template or a second category as not including a logo found in the logo template. In one example, the presence and absence of the score panel is used to form a pattern. A high error signal value for a frame that is above a threshold may categorize the frame in the second category, and a low error signal value below a threshold categorizes the frame in the first category. In one embodiment, the threshold is automatically generated based on the error signal values for given video assets. First, marker frame processor 104 formulates a histogram of the error signal values. The histogram may have two peaks, one for the high matching error and another for the low matching error. In one embodiment, an algorithm is applied to automatically generate a threshold T that lies in between the two peaks.

At 508, marker frame processor 104 may organize the frames that do not include a logo (e.g., the score panel) into frame sequences that may be referred to as clips. The frame sequences may be successive or consecutive frames. Also, the sequence may not have to include consecutive frames, but rather a large concentration of frames within a range. For example, frames 1, 3, 4, 5, 6, 7, 8, and 9 may not include the score panel and form the frame sequence. Frame 2 may have a value that indicates the score panel is present, but the presence of the score panel may be allowed due to possible error. A threshold could be used to determine the boundaries of a frame sequence. That is, every frame in the sequence may not include the logo except for a very few number of frames that do include the logo (this may allow for some slight error). This forms a frame sequence that may be a clip of successive frames that do not include the logo. Using frames that do not include the sports panel is based on prior knowledge that highlights do not typically include the score panel. As discussed above, frames that include the station logo, but not the score panel may be a highlight. In this case, marker frame processor 104 looks for frames that do not include the score panel logo. Although this type of search is performed, other combinations of the presence and absence of logos may be used. For example, marker frame processor 104 may look for frames that include the station logo, but not the score panel. This may be more accurate as a non-highlight may not include the score panel.

At 510, marker frame processor 104 classifies all frame sequences that match the pattern, such as frames without one or more of the logos (e.g., the score panel logo), into multiple categories. In this case, a second categorization is performed because not all frame sequences may be highlights. In one embodiment, it is desired to remove the advertisements from further processing because the advertisements do not have marker frames preceding or after. For example, the categories may be a first category of an advertisement classification and a second category of a non-advertisement classification. However, it will be understood that classifying the frame sequences into advertisement and non-advertisement categories is not necessary. This step may just reduce the amount of processing without introducing a lot of error because advertisements may be identified with reasonable accuracy. In one embodiment, marker frame processor 104 may use a time threshold to determine which frame sequences should be categorized in the advertisement category and which frame sequences should be categorized in the non-advertisement category. In one embodiment, when a frame sequence is associated with an advertisement, the time period of the frame sequence is longer. Thus, a threshold may be used to determine which frame sequences are longer than the threshold, which classifies them as advertisements. In another embodiment, the advertisements are identified independently by other source of information, such as the combination of short period of silence in audio and black frames in video. Combined with the logo absence time feature, more robust advertisement identification can be achieved.

Figure 7:
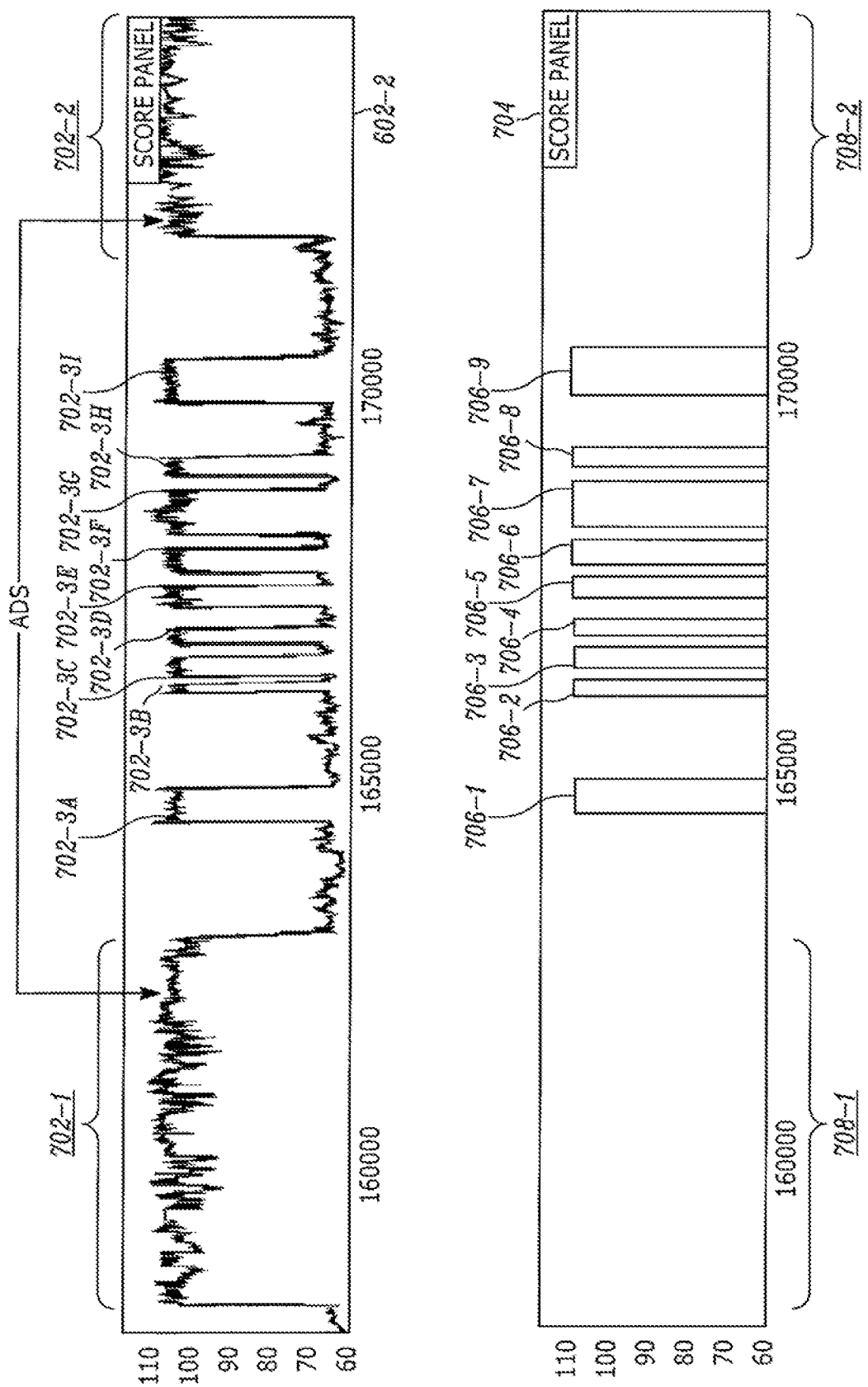
FIG. 7 shows a zoomed-in view of a graph of FIG. 6 according to one embodiment.

To illustrate the categorization of advertisements and non-advertisements, FIG. 7 shows a zoomed-in view of graph 602-2 of FIG. 6 according to one embodiment. The zoomed-in view shows the absence and presence of the score panel logo. The categorization of an advertisement may be based on time. As shown at 702-1 and 702-2, the frame sequences for the absence of the score panel are longer than the frame sequences at 702-3. In one example, the frame sequences at 702-1 and 702-2 are longer than a threshold and these frame sequences are classified as advertisements. The frame sequences shown at 702-3a-702-3i are below the threshold are categorized in the non-advertisement category.

Graph 704 shows an example of the categorization of frame sequences into non-advertisements according to one embodiment. Marker frame processor 104 may analyze the matching error and automatically generate a threshold. Prior knowledge may be used to classify some frame sequences into advertisements. For example, a frame sequence that has a width or time that exceeds a time that typically exceeds how long a highlight runs may be used. Marker frame processor 104 uses the threshold to classify the matching error into a label, such as a binary label 0/1, where 1 indicates the absence of a logo and 0 indicates the presence of a logo. Consecutive frames with labels of "1" are organized into frame sequences. At 706-1-706-8, multiple frame sequences with consecutive "1"s are shown. At 708-1 and 708-2, the frame sequences at 702-1 and 702-2 were longer than the threshold and are thus not included in graph 704 as non-advertisements. The frame sequences 706-1-706-8 are converted into a binary representation, but the original representation could be used.

Referring back to FIG. 5, for all the frame sequences classified as non-advertisements, at 512, marker frame processor 104 performs a frame marker identification process to identify marker frames. Although the following frame marker identification process will be described, it will be understood that variations on the process may be appreciated.

Figure 8:
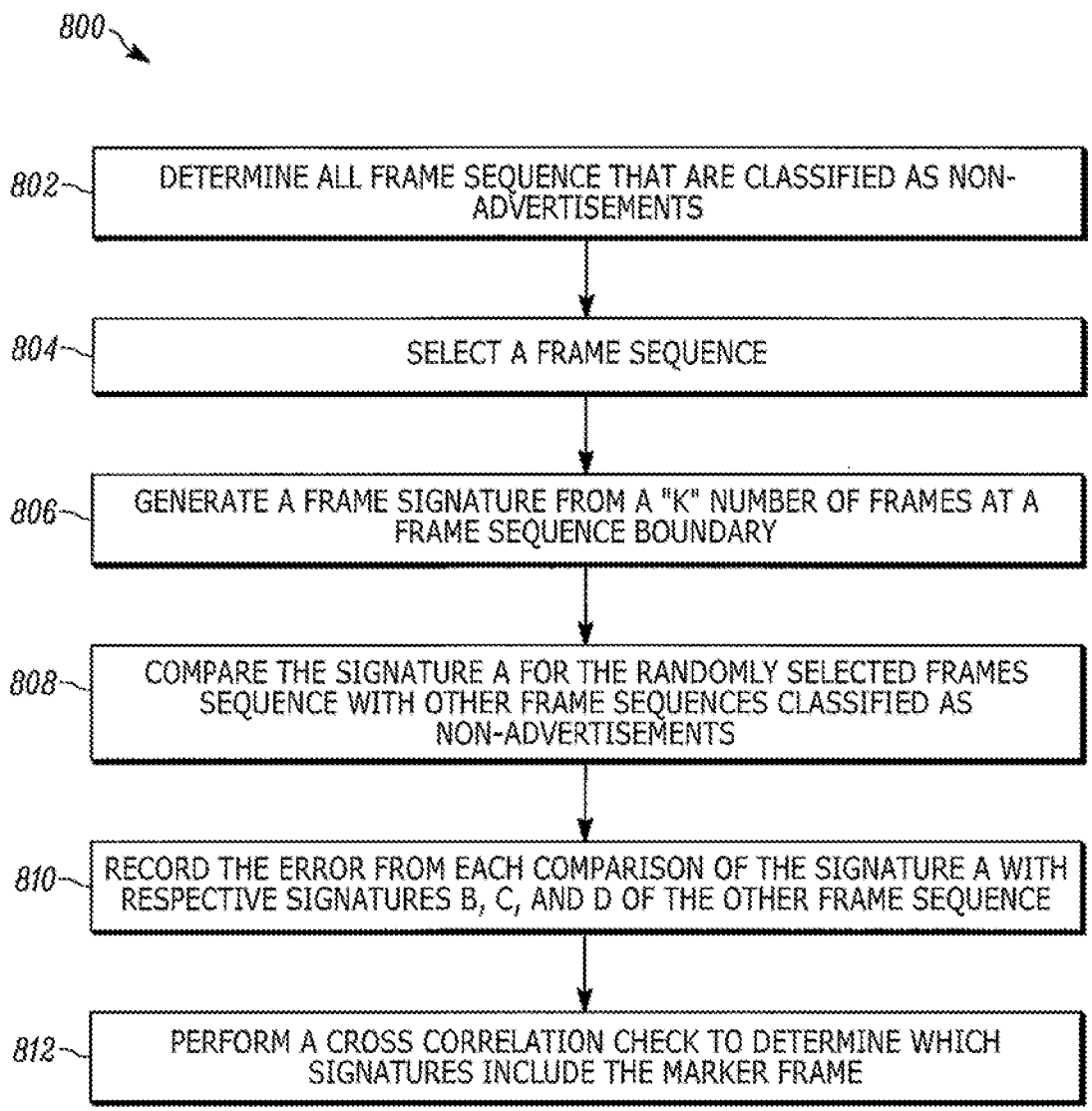
FIG. 8 depicts a simplified flowchart of a method for identifying marker frames according to one embodiment.

FIG. 8 depicts a simplified flowchart 800 of a method for identifying marker frames according to one embodiment. At 802, marker frame processor 104 determines all frame sequences that are classified as non-advertisements. At 804, marker frame processor 104 may select a frame sequence. In one embodiment, a random selection may be used. However, this selection may be performed in other ways, such as a first frame sequence in video 114 may be selected.

Figure 9:
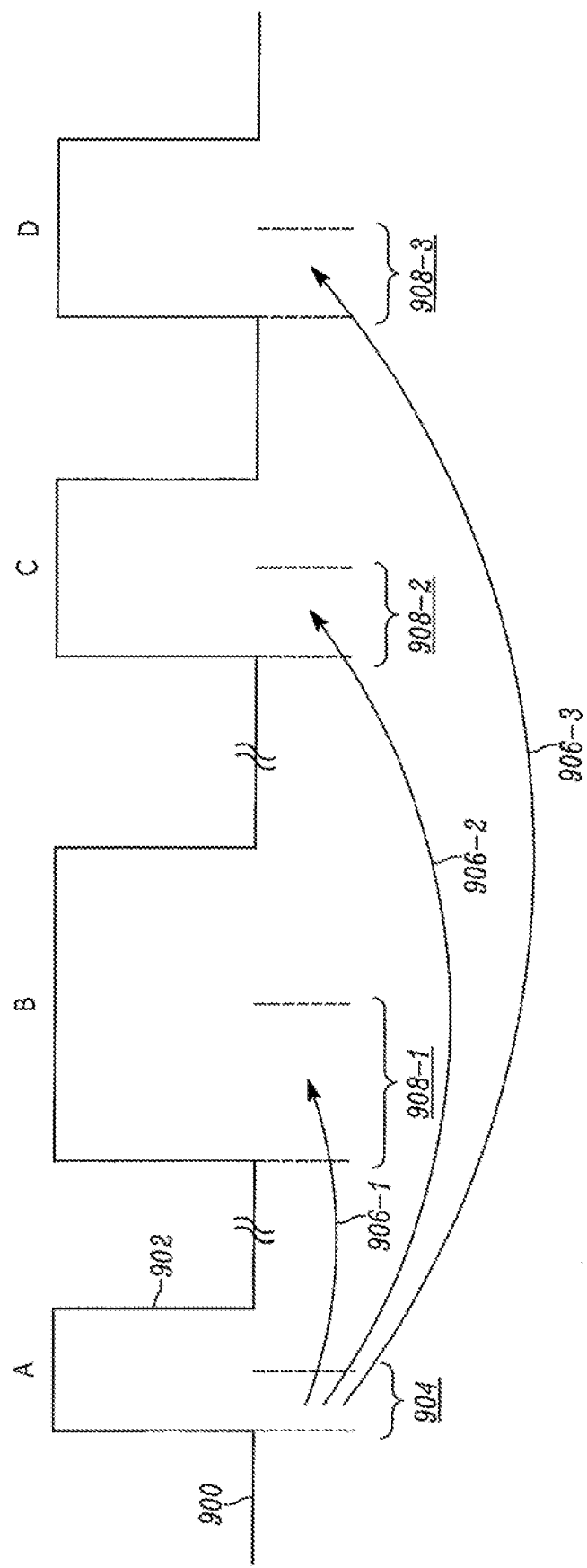
FIG. 9 shows an example of the marker detection process according to one embodiment.

At 806, marker frame processor 104 generates a frame signature from a "k" number of frames at a frame sequence boundary. For example, if it is expected that a marker frame may be included at the beginning or end of the frame sequence, k number of frames is used at the beginning or end of the frame sequence. In another example, the marker frame may be included at other locations, such as in the middle of the frame sequence, and frames are used in the middle of the frame sequence. FIG. 9 shows an example of the marker detection process according to one embodiment. Multiple frame sequences are identified as A, B, C, and D in a signal 900 that represents frame sequences that do not include the score panel logo. Signal 900 a representation of the frame sequences in graph 704. At 902, frame sequence A has been selected as the randomly-picked frame sequence. At 904, K number of frames is selected to generate a signature A for the K number of frames. Marker frame processor 104 samples these k frames to generate the signature. The signature may be information that represents the K frames. In one embodiment, the ColorLayout descriptor and EdgeHistogram descriptor of MPEG-7 are used as the frame signature.

Referring back to FIG. 8, at 808, marker frame processor 104 compares the signature A for the randomly selected frame sequence with other frame sequences classified as non-advertisements. For example, in FIG. 9, marker frame processor 104 compares the signature for frame sequence A with signatures B, C, and D in frame sequences B, C, and D for N frames at 906-1, 906-2, and 906-3, respectively. The number of N frames may be greater than the K frames that were used to generate the signature for frame sequence A. The reason N frames may be larger is to set a range to account for possible variation that offsets the marker content with respect to the beginning of the frame sequences. Although not shown in FIG. 9, frames prior to the start of B, C and D may be included into the N frames. This searches for the best K frames in the other frame sequences that match the signature of the hypothetical marker frames in frame sequence A. That is, if a marker frame is included in the randomly-selected frame sequence A, marker frame processor 104 searches for the marker frame in other frame sequences, such as frame sequence B at 908-1. Further, marker frame processor 104 uses the same first frame signature to search for marker frames in other N frames in frame sequence C at 908-2 and frame sequence D at 908-3. This process is repeated for all frame sequences.

Referring back to FIG. 8, at 810, marker frame processor 104 records the error from each comparison of the signature A with respective signatures B, C, and D of the other frame sequences. The above process may be performed for each frame sequence. That is, frame sequence B is selected and then compared to the other frame sequences. Frame sequence C is then selected, and so on. Comparisons that were already performed may be skipped in some cases, such as A has already been compared with B, so B does not need to be re-compared with A.

At 812, marker frame processor 104 performs a cross correlation check to determine which signatures include the marker frame. The check is performed because the identification of marker frames is being performed without prior knowledge of the marker frame content. To perform the check, marker frame processor 104 may filter out frame sequences that do not match the majority of other frame sequences. This results in a set of frame sequences that are highly correlated with each other as far as the marker sequence is concerned. If this set of frame sequences exists, at 814, marker frame processor 104 outputs the set of marker frames as demarcations in video 114.

Figure 10:
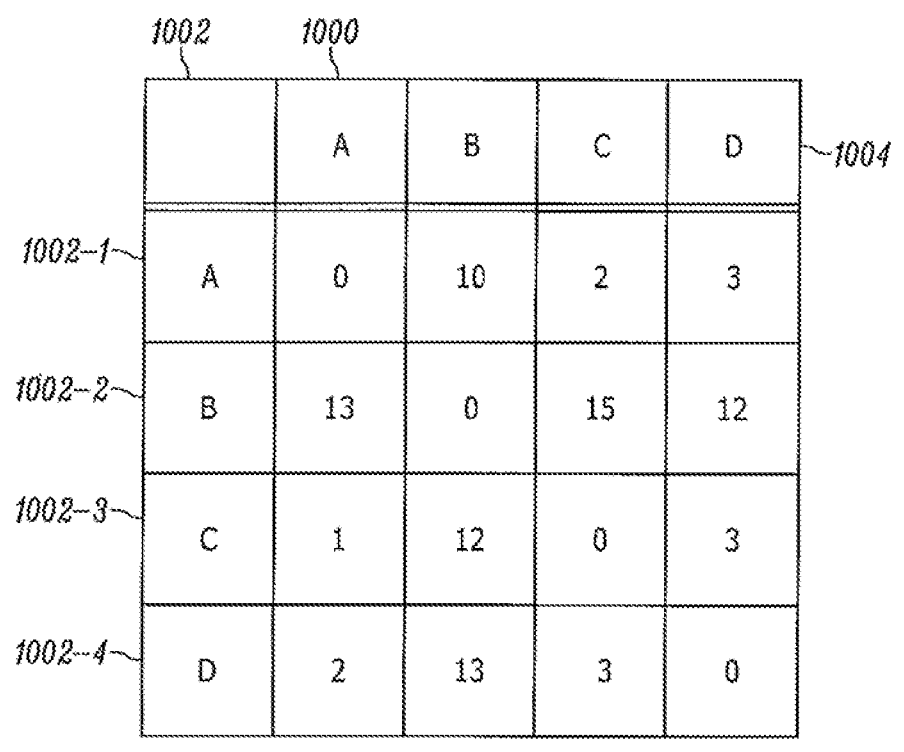

FIG. 10 shows a table 1000 that may be used as a simplified example to perform the correlation according to one embodiment. A row 1002 lists the frame sequences A, B, C, and D and a column 1004 also identifies the frame sequences A, B, C, and D. Values in table 1000 may be error match scores where a higher score indicates a higher error, which indicates a lower match between signatures. That is, the content found in both frame sequences may not match greatly when a higher error is determined. In one example, in a row 1002-1 for frame sequence A, the match score for the same frame sequence A is 0 because it is the same content (this comparison is not performed). For frame sequences B, C, and D, the error score of "10" for frame sequence B is higher than the error score of "2" and "3" for frames sequences C and D. This indicates a good match of the frame signature for frame sequence A is found in frame sequences C and D. Similarly, in a row 1002-3 for frame sequence C, the error score for frame sequence A and frame sequence D is low at "1" and "3", respectively, while the error score for frame sequence B is "12". The same is true for frame sequence D in row 1002-4 where the error score for frame sequence A and frame sequence C is low at "2" and "3", respectively, while the error score for frame sequence B is "13". This cross-correlation verifies that the signatures for frame sequences A, C, and D are very similar, but the frame sequence B is not similar. For example, in row 1002-2, all of the errors scores are high.

In one example, marker frame processor 104 may create a histogram of matching scores and identify a threshold that is used to classify the matching scores into multiple categories, such as a marker frame category and a non-marker frame category. For example, a first category may be where the scores are less than 4 and a second category may be where the scores are greater than or equal to 4. The frame sequences in the first category are used to identify marker frames where the frame sequences in the second category are not used. For example, for the frame sequences that are classified in a first category, marker frame processor 104 may identify a marker frame. Various marker frames may be identified as was described with respect to FIG. 2. An average of these marker frames may be used also. That is all the frames in the frame sequences are averaged to generate a summary marker frame. In addition, different numbers of frames may be sampled and the above process repeated. This is because particular embodiments do not assume how many frames in the marker sequence and may be only a section of it is identified through the cross correlation. Applying steps of flowchart 800 may not always result in identification of marker frames. For example, applying steps of flowchart 800 to error signal 602-1 in FIG. 6 fails to identify marker frames because of consistent high cross matching errors. The reason of high correlation error is that within a highlight scene, the score panel is always absent but not the station logo. This example demonstrates that without prior knowledge about which one of the multiple dominating logos is related to highlights, by cross correlation the right one (the score panel) can be successfully identified.

Accordingly, classifying the frame sequences is performed by cross correlation of a selected hypothetical marker frame signature. This provides a robust way of determining a marker frame without any knowledge of what content is included in the marker frame. Mutual cross-matching is then provided to determine if the selected hypothetical marker frame signature matches other marker frames in similar relative locations in other frame sequences. In the end, the matched marker frames from other frame sequences may be defined as marker frames for the highlight category based on the assumption that the number of highlight clips is more than any other type of clips. That is, the hypothetical marker frame signature that has the most matches may be considered the highlight theme. Other methods of determining the highlight video content may also be appreciated.

Marker frame processor 104 uses the marker frames to determine video demarcations. For example, a start time and an end time for highlights is determined based on the frame identifier of the matched marker frames. In one case, the end of a first marker frame sequence marks the beginning of a highlight and the beginning of a next marker frame sequence marks the end of the highlight sequence. The marker frame sequences are displayed within a certain amount of time.

Detection of Other Types of Content

There may be different types of marker frames that may each signal a different transition, such as a transition to a "recent highlight" video sequence, a "pitch-by-pitch" sequence, or a "last night highlight" sequence. These sequences may be different from the regular video content as highlights may show a previous play; a pitch-by-pitch shows a previous pitch sequence; or last night highlight shows a highlight from last night's game. During all these sequences, the score panel is absent. Once the marker frames for highlight are determined, all highlights from video 114 can be identified and removed. Then other types of marker frames for non-highlight can be identified by means of cross correlation. More detailed examples given below show how to identify non-highlight frame sequence where one or more logos are absent.

Figure 11:
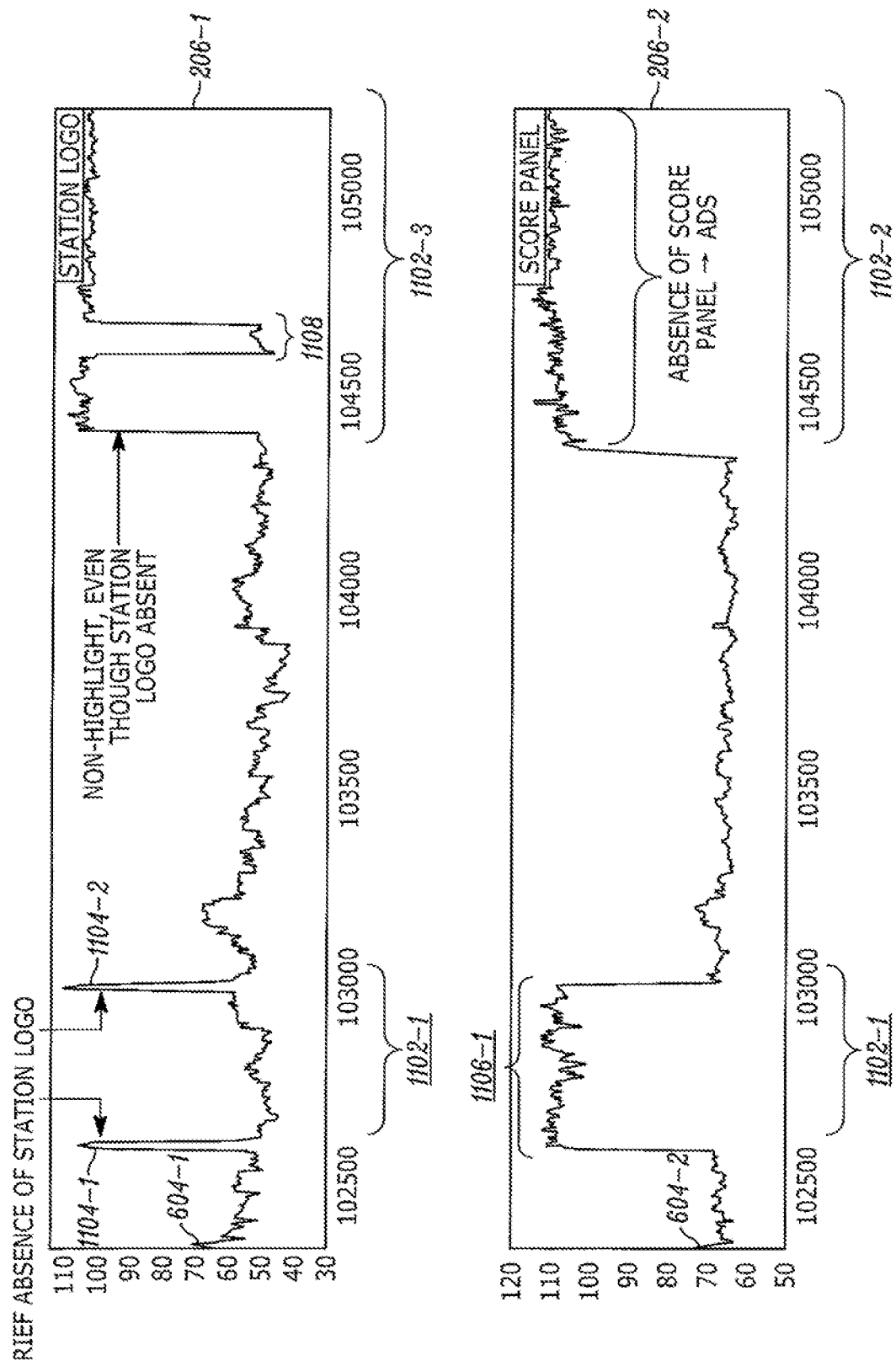
FIG. 11 shows a zoomed-in view of the graphs of FIG. 6 according to one embodiment.

FIG. 11 shows a zoomed-in view of graphs 602-1 and 602-2 according to one embodiment. The zoomed-in views show the absence of the score panel logo and the station logo at different times in video 114. Depending on the pattern of the absence and presence of the score panel logo and the station logo, marker frame processor 104 categorizes the frame sequences in a highlight category, an advertisement category. For the remaining frame sequences where one or more logos are absent, if there are no matched marker frames, they are categorized into a non-highlight category (not an ad or a highlight).

As discussed above, marker frame processor 104 determines the categorization of a frame sequence as a highlight based on the absence of station logo. Also, the presence or absence of score panel logo in a frame sequence may also be taken into account, but does not have to be used. For example, in a frame sequence shown at 1102-1, there is a brief absence of station logo that is shown in error signal 604-1 at 1104-1 and 1104-2 due to a brief spike in the error signal. In this case, the station logo may disappear from a couple of frames in the frame sequence. Also, at 1106-1, error signal 604-2 shows that the score panel disappeared during the entire frame sequence at 1102-1. Based on marker frame matching, this frame sequence 1102-1 is considered a highlight.

In another example, marker frames matching may classify other patterns of segments. For example, in a frame sequence 1102-2 in graph 206-2, the score panel is absent for a long period of time. This may indicate that this sequence is an advertisement. Also, if length is not considered, marker frame matching does not find any match. This frame sequence 1102-2 is not considered a highlight.

Figure 12:
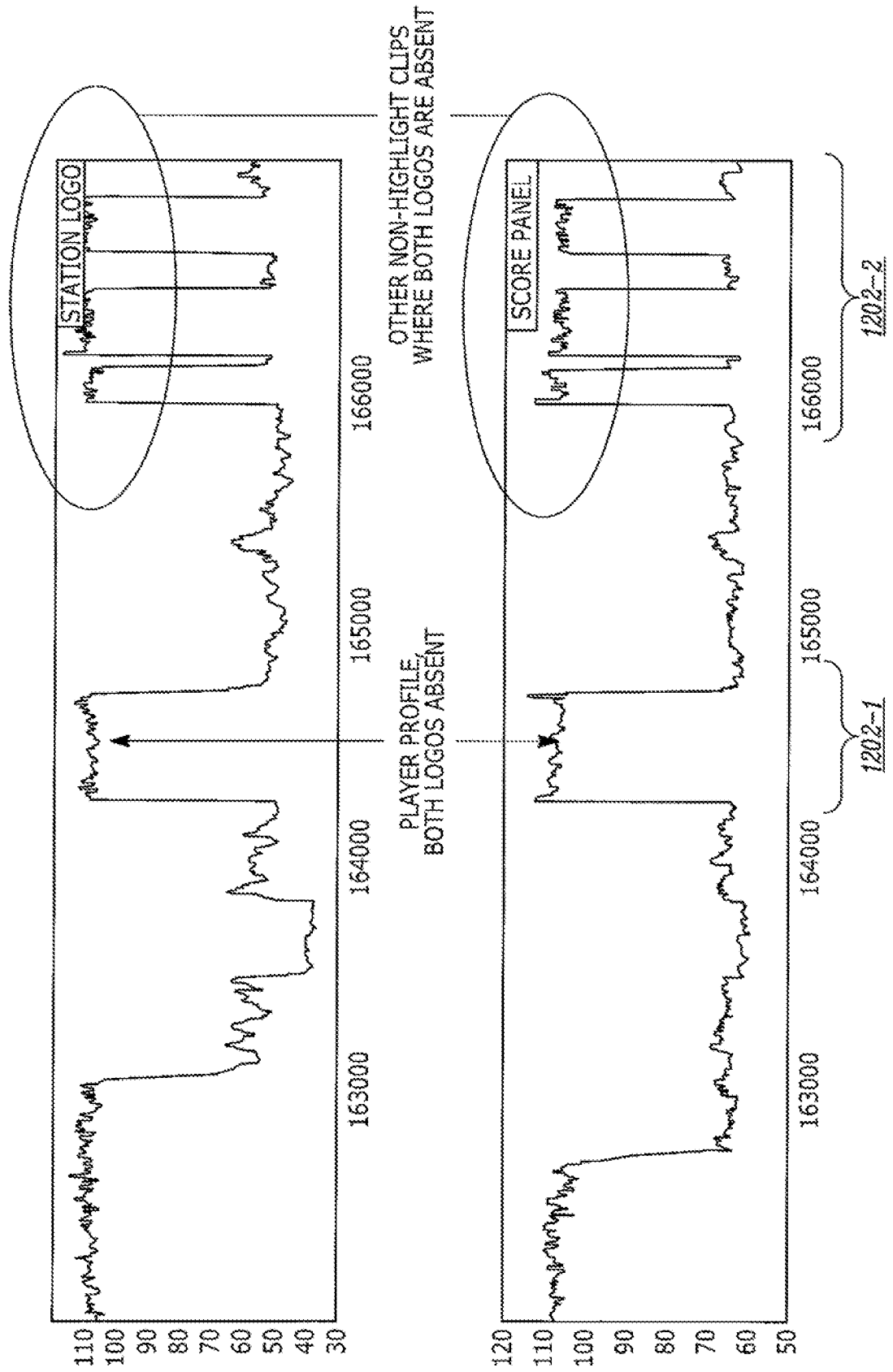
FIG. 12 shows a second example of the graphs of FIG. 6 to illustrate other patterns for categorizing frame sequences according to one embodiment.

FIG. 12 shows a second example of graphs 602-1 and 602-2 to illustrate other patterns for categorizing frame sequences according to one embodiment. These graphs are described to show other non-highlight events. In a frame sequence 1202-1, the score panel logo is absent. So, this frame sequence may be a highlight. However, the station logo is also absent, which may mean this frame sequence is an advertisement, but the length of this frame sequence is less than a threshold indicating that this frame sequence may not be an advertisement. Also, this may not be a highlight as marker matching does not find any marker frames. Rather, the frame sequence may be categorized into a non-highlight category. In this case, a player profile is being shown during this frame sequence. In another frame sequence 1202-2, multiple frame sequences occur where there is the absence of both station logo and score panel logo. Marker frame matching fails to identify any marker frame in these sequences, so these are not considered a highlight.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for identifying video demarcations in a video, the method comprising:
    a first analysis by a logo template processor communicatively coupled to a storage device storing the video, the first analysis including:
        i) analyzing the entire video;
        ii) detecting one or more logos in the video;
        iii) generating at least one logo template of the one or more logos that are detected, the logo template including a logo template image;
    a second analysis by a marker frame processor, the second analysis performed using the at least one logo template, the marker frame processor communicatively coupled to the storage device storing the video, the second analysis including:
        a) retrieving the video from the storage;
        b) receiving the logo template from the logo template processor;
        c) comparing the pixels in the logo template image against frames of the video to determine frames that may include the logo template image; generating an error signal indicating a matching error for every comparison of the logo template against a frame;
        d) classifying frames of the video according to the presence or absence of the logo in the frame by comparing the values of the error signal to a threshold;
        e) organizing the frames into frame sequences according to the classification;
        f) classifying the frame sequences into multiple categories according to the presence or absence of the logo in the frame sequence;
        g) identifying marker frames in the video that include marker content based on the comparison of pixels in the logo template image against the frames of the video, the marker frames being frames of the video that have an error signal below the threshold, wherein marker frames identify video demarcations that indicate transitions in the video from a first content type to a second content type and the marker frames are identified by matching frames at the boundaries of frame sequences of the same category;
        h) outputting, to a video service processor, identifiers for the marker frames, wherein the identifiers indicate at least one of a frame number, a time in the video in which the marker frames are encountered, or other identification information for the marker frames; and
    determining, by the video service processor, segments of different types of video content in the video using the marker frames.

2. The method of claim 1, wherein using a pattern comprises comparing the logo in the set of logos to frames in the video to identify first frames that do not include the logo and second frames that do include the logo.

3. The method of claim 1, wherein the organizing comprises:
    classifying the first frames or the second frames into a first category of frame sequences and a second category of frame sequences, wherein the first category of frame sequences have a length shorter than the second category of frame sequences.

4. The method of claim 3, wherein the first category of frame sequences are included in the plurality of frame sequences and the second category of frame sequences are not included in the plurality of frame sequences.

5. The method of claim 4, wherein frame sequences in the second category of frame sequences have the length that is above a threshold.

6. The method of claim 1, wherein determining the marker content comprises:
    performing a cross correlation process using video content in the plurality of frame sequences to determine the marker content without prior knowledge of the marker content.

7. The method of claim 1, wherein determining marker content comprises:
    analyzing a first frame sequence in the plurality of frame sequences to determine a first signature from video content in at least a portion of the first frame sequence, the first signature representing the video content in the at least a portion of the first frame sequence; and
    comparing the first signature with video content in other frame sequences in the plurality of frame sequences to determine the marker content.

8. The method of claim 7, wherein the first frame sequence is randomly selected.

9. The method of claim 7, wherein comparing the first signature with the video content in other frame sequences comprises:
    determining second signatures from the video content in the other frame sequences; and
    comparing the first signature with the second signatures to determine which second signatures match the first signature.

10. The method of claim 9, wherein:
the first signature is from a first number of frames in the first frame sequence, and
the second signatures are from a second number of frames in the other frame sequences.

11. The method of claim 10, wherein at least a portion of the first number of frames and the second number of frames are at a beginning of the first frame sequence and the other frame sequences.

12. The method of claim 9, wherein comparing comprises:
determining a threshold for a match between the first signature and the second signatures;
generating an error match value for each comparison of the first signature with each of the second signatures; and
forming the plurality of frame sequences with frame sequences that have error match values that indicate the other frame sequences match the first signature based on the threshold.

13. A system for identifying video demarcations in a video, the system comprising:
a storage device storing the video;
a logo processor arranged to determine one or more logos, wherein the one or more logos are detected by analyzing a video;
a marker frame processor arranged to select a logo in the one or more logos;
a logo template processor communicatively coupled to the storage device storing the video, the logo template processor arranged to perform a first analysis, the first analysis including:
i) analyzing the entire video;
ii) detecting one or more logos in the video;
iii) generating at least one logo template of the one or more logos that are detected, the logo template including a logo template image;
the marker frame processor further arranged to determine a pattern associated with the logo in the video to identify a plurality of frame sequences in the video, wherein the pattern comprises a presence or absence of the logo in the video;
the marker frame processor further arranged to determine marker content for a set of marker frames by analyzing video content of the plurality of frame sequences, wherein the marker content is used to transition from a first content type to a second content type in at least of portion of the plurality of frame sequences in the video; and
the marker frame processor further arranged to determine a set of video demarcations based on the set of marker frames, the set of video demarcations used to segment the video into video segments
the marker frame processor further arranged to perform a second analysis, the second analysis performed using the at least one logo template, the marker frame processor communicatively coupled to the storage device storing the video, the second analysis including:
a) retrieving the video from storage;
b) receiving the logo template from the logo template processor;
c) comparing the pixels in the logo template image against frames of the video to determine frames that may include the logo template image; generating an error signal indicating a matching error for every comparison of the logo template against a frame;
d) classifying frames of the video according to the presence or absence of the logo in the frame by comparing the values of the error signal to a threshold;
e) organizing the frames into frame sequences according to the classification;
f) classifying the frame sequences into multiple categories according to the presence or absence of the logo in the frame sequence;
g) identifying marker frames in the video that include marker content based on the comparison of pixels in the logo template image, the marker frames being frames of the video that have an error signal below the threshold, wherein marker frames identify video demarcations that indicate transitions in the video from a first content type to a second content type and they are identified by matching frames at the boundaries of frame sequences of the same category;
h) outputting, to a video service processor, identifiers for the marker frames, wherein the identifiers indicate at least one of a frame number, a time in the video in which the marker frames are encountered, or other identification information for the marker frames; and
a video service processor arranged to determine segments of different types of video content in the video using the marker frames.

14. The system of claim 13, wherein the processed video comprises only the at least the portion of the frame sequences.

15. The system of claim 13, further comprising:
a video delivery system configured for sending the processed video to a client.

* * * * *